United States Patent [19]

Blanc et al.

[11] Patent Number: 4,535,569
[45] Date of Patent: Aug. 20, 1985

[54] ARRANGEMENT FOR STARTING-UP A POSITION REGULATOR OF A GRINDING WHEEL SUPPORT

[75] Inventors: Guy-Francois Blanc, Zürich; Fritz Loehrer, Bäch, both of Switzerland

[73] Assignee: Maag Gear-Wheel and Machine Company, Zürich, Switzerland

[21] Appl. No.: 423,436

[22] Filed: Sep. 24, 1982

[30] Foreign Application Priority Data

Oct. 1, 1981 [CH] Switzerland .............. 6346/81

[51] Int. Cl.$^3$ .............................................. B24B 49/00
[52] U.S. Cl. .................................................. 51/165.9
[58] Field of Search ............. 51/165.8, 165.85, 165.9; 60/442; 91/43, 45

[56] References Cited

U.S. PATENT DOCUMENTS

| | | | |
|---|---|---|---|
| 2,022,646 | 12/1935 | Belden et al. | 91/45 X |
| 2,339,024 | 1/1944 | Markson | 91/43 X |
| 3,407,543 | 10/1968 | Gebel | 51/165.9 |
| 3,553,903 | 1/1971 | Christie | 51/165.9 |
| 4,106,390 | 8/1978 | Kodaira et al. | 91/43 X |
| 4,226,053 | 10/1980 | Inoue | 51/165.8 X |
| 4,339,984 | 7/1982 | Huhne | 91/43 X |
| 4,368,596 | 1/1983 | Wada et al. | 51/165.9 X |

FOREIGN PATENT DOCUMENTS 1552761 2/1973 Fed. Rep. of Germany .

Primary Examiner—James G. Smith
Attorney, Agent, or Firm—Werner W. Kleeman

[57] ABSTRACT

A grinding wheel support, for instance of a large gear grinding machine, moves up and down during the grinding operation in a non-horizontal guide and is driven by a linear motor which does not possess any self-locking action, for instance a piston-and-cylinder arrangement which is powered by a pressurized oil pump. A brake retains the grinding wheel support in its rest position. During the transition from the rest position into the position-regulation mode the grinding wheel support must not carry out any uncontrolled or undesired movements. Therefore, the grinding wheel support, starting from the time that it is placed into operation out of its rest position, is allowed a certain upward movement play, in order to render possible a surge-free placement into operation of the actual position regulation operation of the position regulator. For this purpose a position measuring system measures a starting position-actual value in the rest position, to which there is added a part of the movement play by means of a set value former, in order to thus define a starting position-set or reference value. The position regulator then controls the pump until the grinding disk support has reached the starting position-set value under the action of the linear motor. At this point in time the brake is released and there can begin the actual position regulation operation.

9 Claims, 2 Drawing Figures

ARRANGEMENT FOR STARTING-UP A POSITION REGULATOR OF A GRINDING WHEEL SUPPORT

BACKGROUND OF THE INVENTION

The present invention relates to a new and improved arrangement for starting a position regulator of a grinding wheel support or carrier and, in particular, relates to an improved arrangement or apparatus for regulating the start-up of a position-regulated grinding wheel support.

Generally speaking, the inventive arrangement for start-up of a positon regulator of a grinding wheel support or carrier contemplates the provision of a linear motor which does not possess any self-locking action and moves the grinding wheel support out of its rest position non-horizontally, and such movement can be detected by a position measuring system connected with the position regulator.

The grinding wheel supports or carriers of gear grinding machines move, during the grinding operation, in a non-horizontal guide up and down by virtue of the driving action of a linear motor. Such linear motors are generally hydraulic motors which are powered by a controllable pressure or pressurized oil pump. If the grinding wheel support is in its rest position, either because the machine has been turned-off or because it is located in a preparatory phase prior to the actual grinding operation, then the linear motor is not pressurized, and consequently, because it does not have any self-locking action it must be retained in its rest position. During the grinding operation there is then regulated the movement of the grinding wheel support by means of a position regulator, so that there can be maintained exact reversal points during the grinding mode.

The transition from the rest position into the position regulating mode must be accomplished such that the grinding wheel support does not perform any undesired movements. This means that the actual position regulation of the grinding wheel support first can begin when there is present the output power of the linear motor needed for taking-up the load by the linear motor, in other words, after there has been built-up the oil pressure needed for taking-up the load when using a hydraulic linear motor, something which requires a certain amount of time after turning-on the pump operatively associated with the linear motor. The oil pressure needed for this purpose is only approximately known and is dependent upon the variable inclined position of the grinding wheel support guides. A pressure control for the initiation of the actual position regulation operation or mode therefore would be complicated and inaccurate.

SUMMARY OF THE INVENTION

Therefore, with the foregoing in mind it is a primary object of the present invention to provide a new and improved arrangement for starting a position regulator of a grinding wheel support in a manner not associated with the aforementioned drawbacks and shortcomings.

Another and more specific object of the present invention is directed to a new and improved arrangement for starting a position regulator of a grinding wheel support, wherein the actual position regulation first then is initiated after there has been determined that the output power of a linear motor has attained such a value that the grinding wheel support will no longer perform any undesired or unknown movements.

Yet a further significant object of the present invention is directed to an improved arrangement for start-up of a position regulator of a grinding wheel support, which arrangement is relatively simple in construction and design, extremely reliable in operation, not readily subject to breakdown or malfunction, and requires a minimum of maintenance and servicing.

Now in order to implement these and still further objects of the invention, which will become more readily apparent as the description proceeds, the inventive arrangement for the start-up of a position regulator of a grinding wheel support contemplates that a brake is operatively associated with the grinding wheel support, this brake retaining the grinding wheel support in a defined rest or starting position and allows for a slight movement play in one direction out of such starting position. A set or reference value former operatively connected with a position measuring system and the position regulator is provided, this set value former adding to the defined rest position measured by the position measuring system a selectively small starting path within the limits of the movement play, and thus, forming a starting position-set or reference value at which there should be initiated the actual position regulation by the position regulator. There is provided for the linear motor a supply device which is remotely controlled by the position regulator. A threshold value detector is provided which is connected with the position regulator, with a set value transmitter and the brake. This threshold value detector activates the set value transmitter and releases the brake when the difference, determined by the position regulator, between the starting position-set or reference value and the starting position-actual value has reached the threshold value.

The arrangement of the invention operates with a brake which retains the linear motor in a defined rest or initial position when such linear motor is turned-off or has assumed the preparatory phase prior to the actual grinding operation or mode, and allows a certain upward movement play for the linear motor, so that when the output power of the linear motor has been built-up to such an extent that such can take-up the load and has overcome the frictional forces, the grinding wheel support begins to upwardly move. As soon as it has moved through a predetermined path, which is transmitted to the threshold value detector by virtue of the set value-actual value difference formation in the position regulator, there is initiated the actual position regulation mode or operation by switching-in the set value transmitter and releasing the brake. Beginning from this point in time there is ensured that the grinding wheel support no longer can perform any uncontrolled or undesired movements, because the output power of the linear motor has sufficiently increased to a point that the placement into operation of the actual position regulation can be accomplished free of surges.

According to a further feature of the invention the brake can contain two brake jaws which, when the brake is actuated, can force-lockingly or form-lockingly connect the grinding wheel support with a vertically moveable rod determining the defined rest position. By virtue of this design, with the linear motor turned-off its defined rest position is maintained by the arresting or blocking device, which with the brake activated is force-lockingly or form-lockingly connected with the rod. After the start of the actual position regulation the arresting device is retracted from the rod, and upon turning-off the linear motor it is automatically again connected in the defined rest position with the rod, so that during the next start-up operation such again begins to move out of the same defined rest or initial position. During start-up of the linear motor the grinding disk support entrains the rod, and when the rod has moved through a certain path, the brake is released. The rod or rod member then returns into its starting position where, following the turning-off of the linear motor, it is again connected by means of the arresting device with the grinding wheel support.

The linear motor can comprise a hydraulic piston-and-cylinder arrangement, the moveable cylinder of which is fixedly connected with the grinding wheel support. Also, the linear motor can comprise a spindle-nut arrangement driven by a hydraulic rotary drive, and the nut which is moved by the rotatable spindle is fixedly connected with the grinding wheel support. With this system design the absent self-locking action of the linear motor is compensated in that its cylinder or spindle nut, as the case may be, is fixedly connected with the grinding wheel support and such is retained by means of the brake with the aid of the arresting device in the defined rest position.

Furthermore, the position regulator can control the pressure oil pump which shifts the moveable part of the linear motor in accordance with a positioning or adjustment signal delivered by the position regulator. With a grinding disk support containing such type of drive the arrangement of the present invention is particularly useful because the hydraulic drive usually is of considerable volume and must be connected over long lines or conduits with the pump, so that following switching-on of the linear motor a certain amount of time is needed until there has built-up the oil pressure required for taking-up the load by the linear motor. Only after such pressure build-up has been sufficiently accomplished does the inventive arrangement turn-on the actual position regulation, so that the transition from the rest position into such position regulation mode can be accomplished without any uncontrolled or undesired movements of the grinding wheel support.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
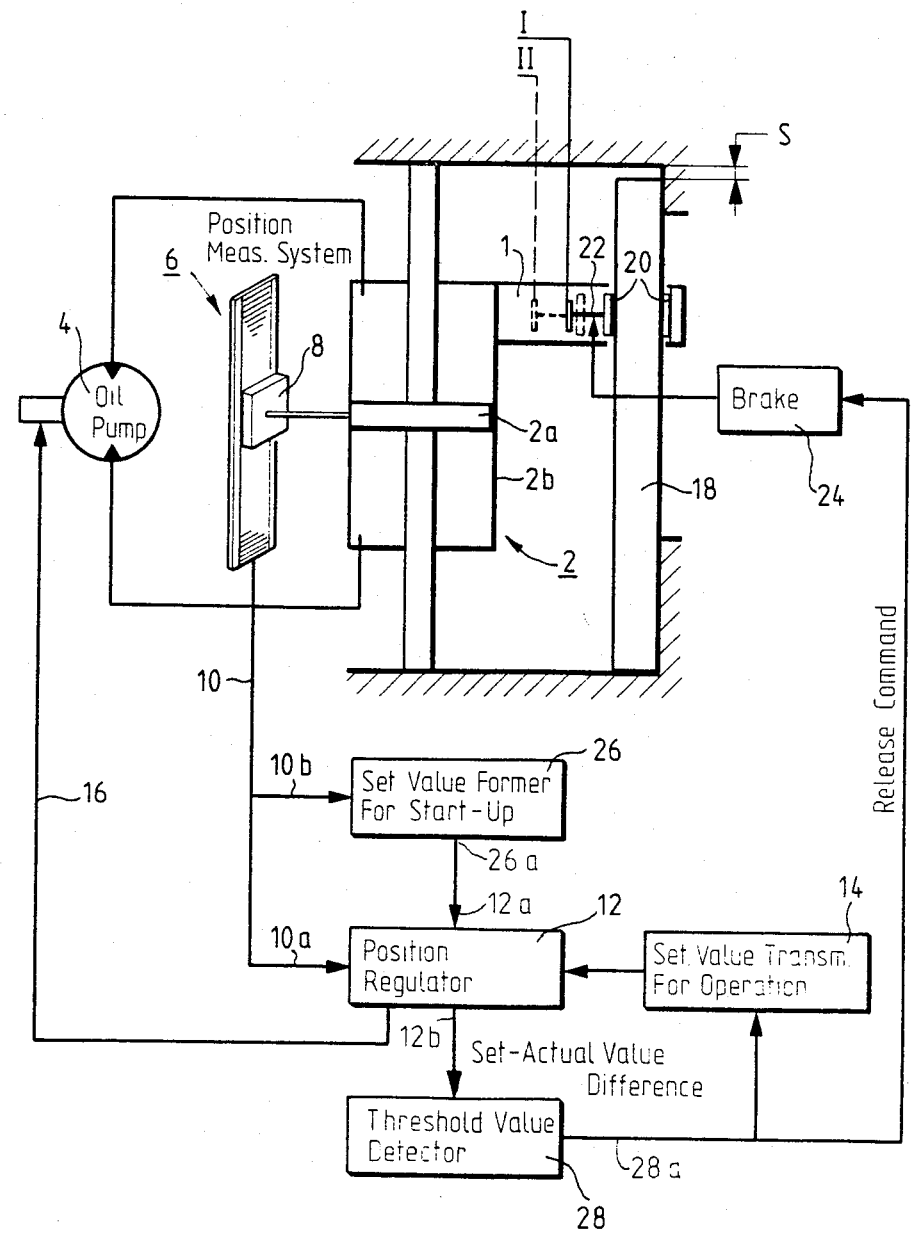
FIG. 1 schematically illustrates a linear motor composed of a piston-and-cylinder arrangement containing an arrangement constructed according to the invention for start-up of the position regulator of a grinding wheel support.

Describing now the drawings, it is to be understood that in order to simplify the illustration of the drawings only enough of the construction of a gear grinding machine, with which the invention can be beneficially used for instance, has been shown as will enable those skilled in the art to readily understand the underlying principles and concepts of the present development. Turning attention now specifically to FIG. 1, there is schematically depicted therein a grinding wheel support 1, for instance of a large gear grinding machine, which can be moved up-and-down or elevationally displaced by means of a suitable linear motor 2. This up-and-down movement is not necessarily a vertical movement, because such type of grinding wheel supports travel in support guides which can have a variable inclined or oblique position which is dependent upon the grinding operation. In the exemplary embodiment depicted in FIG. 1, the linear motor 2 comprises a stationary piston 2a and a moveable cylinder 2b which is connected with the grinding wheel support 1 for driving the same. The not particularly referenced chambers within the cylinder 2b and located above and below the piston 2a, i.e., at opposite piston faces thereof, are supplied with and emptied of a pressurized fluid medium by means of a controllable pressure or pressurized oil pump 4 as a function of the movement which is to be performed by the grinding wheel support 1. A suitable position measuring system 6, with which there is operatively associated a measuring head 8 fixedly connected with the cylinder 2b, continuously measures the position of the cylinder 2b, and thus, that of the grinding wheel support or carrier 1. The position measuring system 6 has an output conductor or line 10 which is connected by means of a branch or branch line 10a with a position regulator 12 and continuously inputs thereto the actual value of the position of the grinding wheel support 1. The position regulator 12 is connected, on the other hand, with a set or reference value transmitter 14, and by means of an output line or conductor 16 the position regulator 12 inputs a positioning or adjustment signal i.e. a control signal to the controllable pump 4, in order to move the grinding wheel support 1 into the appropriate position. This positioning or adjustment signal which is delivered to the controllable pressure pump 4 is derived from a difference formation between the actual value received by means of the branch or branch line 10a and the set or reference value received from the set or reference value transmitter 14.

Up to this point there has been described the actual position regulation circuit of the position regulator 12 with the therefore required components of the regulation path or loop. Such position regulation circuit can not merely be started-up out of the rest position of the grinding wheel support 1, because such grinding wheel support, during its transition from the rest position into the position regulation mode or operation, can perform uncontrolled and undesired movements. With such construction of regulation circuit it is not possible to unambiguously determine when the oil pressure needed for taking-up the load by the linear motor 2 has been built-up to such a magnitude by the pressure pump 4 that there are precluded any uncontrolled and undesired movements of the grinding wheel support 1.

It is for this reason that there are employed the teachings and arrangement of the invention. Adjacent to the grinding wheel support 1 there is arranged a rod or rod member 18 which, in the exemplary embodiment under discussion and illustrated in the showing of FIG. 1, is surrounded by two brake jaws 20 of a remotely controllable brake 24. The brake jaws 20 are actuated by means of a brake rod 22. On the other hand, the rod 18, which bears at its lower end upon a fixed support, as shown, at its upper end has a certain movement play S which, for instance, is in the order of magnitude of millimeters.

With the linear motor 2 turned-off, i.e., with the pump 4 turned-off or ineffectual, and thus, the linear motor 2 not placed under pressure, the brake jaws 22 which engage about the rod 18 when the brake 24 has been activated retain the grinding disk support or carrier 1 in a defined rest or starting position. The position then assumed by the brake jaws 22 engaging the rod 18 with the brake 24 actuated has been indicated in FIG. 1 by the position I shown in full lines.

The output line 10 of the position measuring system 6 leads by means of a branch line or branch 10b to a set value former 26, the output 26a of which is connected with one input 12a of the position regulator 12. This set or reference value former 26 forms a set or reference value for the start-up, the purpose of which will be explained more fully hereinafter during the course of this disclosure, in that it, in the position of the grinding wheel support 1 depicted in FIG. 1, forms by an addition or summation operation a set or reference value from the actual value of the position of the grinding wheel support 1 measured by the position measuring system 6 and a certain fraction, for instance, 1 mm, of the movement play S of the rod 18. Upon reaching this set value there should be accomplished the actual position regulation operation of the position regulator 12 based upon the actual value furnished by means of the branch line 10a and the set or reference value furnished by means of the set value transmitter 14. The formation of the starting position-set value by the set value former 26 is predicated upon the concept that starting with the attainment of such set value a sufficient pressure has built-up in the linear motor 1 after such has displaced or shifted the grinding wheel support 1 together with the rod 18 already through a certain path, here assumed to be 1 mm, and thus, there has been attained the power or output needed for taking-up the load and for overcoming the frictional forces, so that there can be accomplished the transition from the position regulation-starting operation to the actual position-regulation operation without there arising any uncontrolled and undesired movements of the grinding wheel support 1.

The position regulator 12 is connected by means of a further output 12b with a threshold value detector 28, the output 28a of which is connected with the set value transmitter 14 and with the brake 24, as shown. The position regulator 12, starting with the turning-on of the pressure pump 4 and thus beginning with the start-up of the linear motor 2, continuously forms the difference between the position-actual value furnished by means of the branch line 10a and the position-set value furnished by the set value former 26, and delivers this difference in the form of an appropriate control or difference signal to the threshold value detector 28. After the set value-actual value difference has finally dropped below a predetermined threshold value of the threshold value detector 28, which can be selected in accordance with the quality of the employed position regulator 12, then the threshold value detector 28 delivers a command to the set value transmitter 14 and at the same time a brake release command to the brake or brake unit 24, so that there can be initiated the actual position regulation mode or operation and, at the same time, by releasing the brake 24 it is possible to bring the brake rod 22 into the position II illustrated in broken or phantom lines in FIG. 1, so that the grinding wheel support 1 can now freely travel.

The arrangement illustrated in FIG. 1 operates in the following manner: In the rest position of the grinding wheel support 1 there is measured, by means of the position measuring system 6, the position-actual value. At the moment of placing into operation the position regulator 12, the pressure pump 4 and thus the linear motor 2, there is formed for the starting operation, by means of the set value former 26, a starting position-set value from the sum of the position of the position-actual value measured at the point of start-up and a portion of the movement play S of the rod 18, for instance S/2. The position regulator 12 controls the pressure pump 4 until, under the action of the linear motor 2, the grinding wheel support or carrier 1 has reached the position determined by the starting-set value. This point in time is determined by the threshold value detector 28, which now can release the brake 24 without the grinding wheel support 1 performing any undesired or uncontrolled movements. From this point in time on there is started the actual position regulation operation, during which there then only participate the position regulator 12 along with the position measuring system 6, which delivers thereto the position-actual value, and the set value transmitter 14 which delivers thereto the position-set value of the grinding wheel support 1. After release of the brake 24 the rod or rod member 18 returns back into its defined starting position which, in the described exemplary embodiment, has been moved upwardly through for instance 1 mm by the grinding wheel support 1. After turning-off of the linear motor 2 the brake 24 automatically is again activated, so that the brake jaws 20 fixedly clamp about the rod member 18. The next grinding operation can be initiated from this defined rest or starting position of the grinding wheel support 1.

Figure 2:
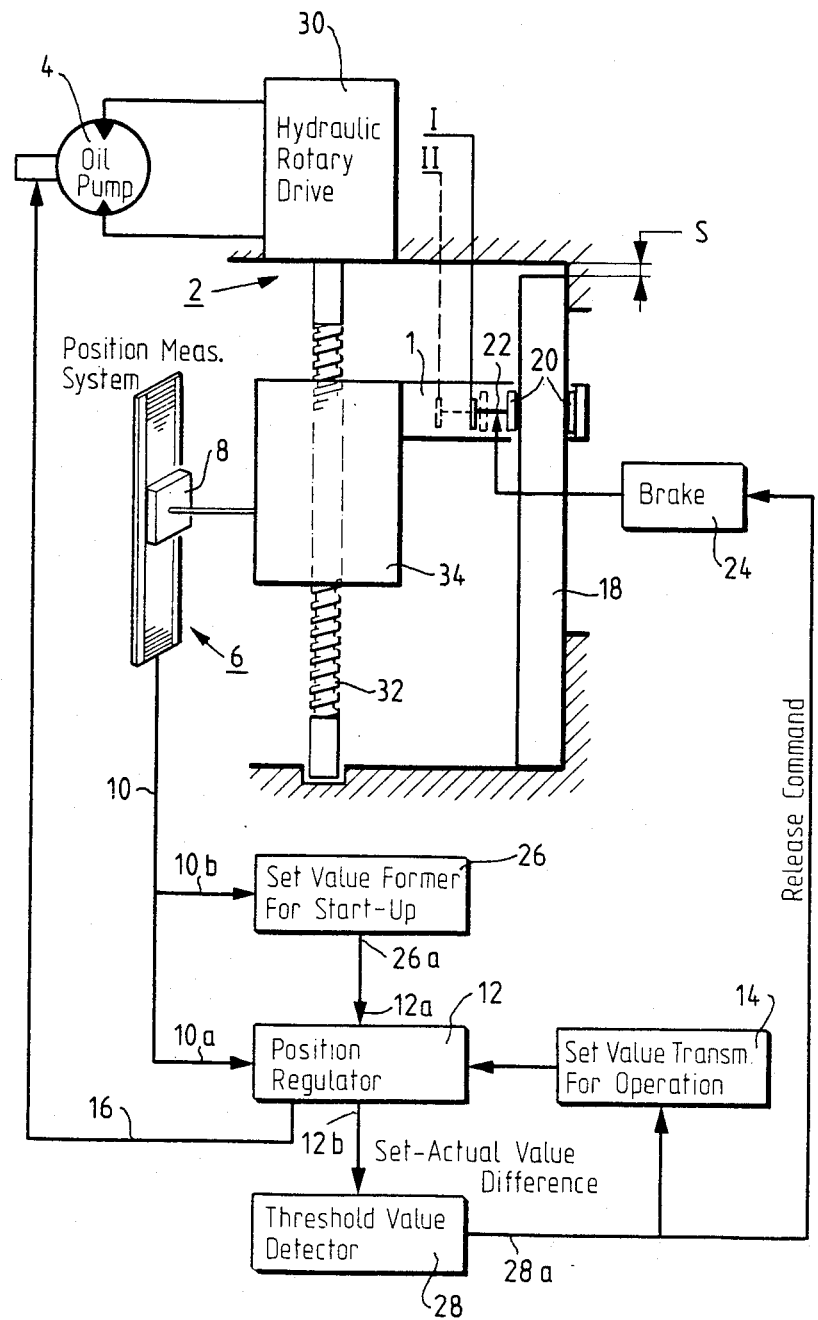
FIG. 2 illustrates a further exemplary embodiment of the invention wherein the linear motor is constituted by a spindle-nut arrangement driven by a hydraulic rotary drive.

Continuing, FIG. 2 illustrates an exemplary embodiment which as to its significant details essentially coincides with the exemplary embodiment described previously with reference to FIG. 1 and, accordingly, there have been generally used the same reference characters to denote the same or analogous components. In the embodiment of FIG. 2, the linear motor 2 is here constituted by a hydraulic rotary drive 30 which is supplied with pressurized oil by means of the controllable pressure pump 4 and rotates in the one or other direction a threaded spindle 32 which is rotatably mounted at its lower end. This threaded spindle 32 is in operative engagement with a spindle nut or nut member 34 which is fixedly connected with the grinding wheel support 1 and moves up-and-down during the rotation of the threaded spindle 32. Such type of linear motor also does not have any self-locking action, since when the rotary or rotatable drive 30 is not pressurized the spindle nut 34 could move into an undefined rest position under the action of its inherent weight and the weight of the grinding wheel support or carrier 1.

The arrangement described in conjunction with FIG. 1 for the start-up of the position regulator 12 also ensures in this case that the actual position regulation operation first is turned-on at that point in time when there has built-up a sufficient oil pressure and the brake 24 can be released, so that the actual position regulation operation can be initiated, without the grinding wheel support 1 performing any undesired or unknown motions.

While there are shown and described present preferred embodiments of the invention, it is to be distinctly understood that the invention is not limited thereto, but may be otherwise variously embodied and practiced within the scope of the following claims. Accordingly,

What we claim is:

1. An arrangement for regulating the start-up of a position-regulated displaceable grinding wheel support, comprising;
   a linear motor which does not have any self-locking action and serves to move the grinding wheel support out of a defined rest position thereof;
   a position measuring system detecting the defined rest position of said grinding wheel support;
   a position regulating system regulating the position of said grinding wheel support during a start-up phase and during an operational phase of the positional regulation thereof;
   said position measuring system being operatively connected with said position regulating system;
   brake means operatively associated with said grinding wheel support;
   a retaining element defining a predetermined displacement path;
   said brake means acting upon said retaining element such that said brake means engage said retaining element in said defined rest position of the grinding wheel support which thus is supported at said retaining element; and
   said brake means being operatively connected to said position regulating system such that, during said start-up phase of said positional regulation of said grinding wheel support and starting from said defined rest position thereof, a start-up set position is determined by means of a small start-up distance which is selected within said predetermined displacement path defined by said retaining element, and such that said operational phase of the positional regulation of said grinding wheel support is started and said brake means are released at said start-up set position of said grinding wheel support.

2. The arrangement as defined in claim 1, wherein: said position regulating system comprises:
   a position regulator defining an input side connected to an output side of said position measuring system and an output side;
   a set value former connected on its input side to said output side of said position measuring system;
   said set value former adding to the defined rest position measured by the position measuring system said selectable small start-up distance and thus forming a start-up set position at which there is terminated said start-up phase of said positional regulation of said grinding wheel support and at which there is initiated said operational phase of the positional regulation of the grinding wheel support, when said grinding wheel support arrives at an actual start-up position which equals said start-up set position;
   a controllable pressure oil pump connected to said output side of said position regulator;
   a threshold value detector connected on its input side to said output side of said position regulator and detecting equality between said actual start-up position and said start-up set position;
   a set value transmitter for said operational phase of the positional regulation of said grinding wheel support and connected on its input side to an output side of said threshold value detector;
   said brake means being connected to the output side of said threshold value detector; and
   said set value transmitter being connected on its output side to said input side of said position regulator in order to deliver set values during said operational phase of said positional regulation of said grinding wheel support and thus for controlling said controllable pressure oil pump.

3. The arrangement as defined in claim 1, wherein:
   said retaining element constitutes a displaceable rod which is displaceable in essentially the same manner as said guiding wheel support; and
   said displaceable rod bearing upon a bed of said grinding wheel support in order to support the same in said defined rest position thereof.

4. The arrangement as defined in claim 1, wherein:
   said linear motor comprises a hydraulic piston-and-cylinder arrangement;
   said cylinder of said piston-and-cylinder arrangement being moveable; and
   said moveable cylinder being fixedly connected with said grinding wheel support.

5. The arrangement as defined in claim 1, wherein:
   said linear motor comprises a hydraulic piston-and-cylinder arrangement;
   said cylinder of said piston-and-cylinder arrangement being moveable; and
   said moveable cylinder being fixedly connected with said grinding wheel support.

6. The arrangement as defined in claim 1, wherein:
   said linear motor comprises a spindle-nut arrangement comprising a rotatable spindle and a nut member;
   a hydraulic rotary drive for driving said spindle-nut arrangement;
   said nut member being moveable by means of said rotatable spindle; and
   said nut member being fixedly connected with the grinding wheel support.

7. The arrangement as defined in claim 1, wherein:
   said linear motor comprises a spindle-nut arrangement comprising a rotatable spindle and a nut member;
   a hydraulic rotary drive for driving said spindle-nut arrangement;
   said nut member being moveable by means of said rotatable spindle; and
   said nut member being fixedly connected with the grinding wheel support.

8. The arrangement as defined in claim 4, wherein: said supply means comprises a pressurized oil pump.

9. The arrangement as defined in claim 6, wherein: said supply means comprises a pressurized oil pump.

* * * * *